United States Patent
Futa, Jr. et al.

(10) Patent No.: US 7,607,285 B2
(45) Date of Patent: Oct. 27, 2009

(54) FOUR MODE THERMAL RECIRCULATION THROTTLE VALVE

(75) Inventors: Paul W. Futa, Jr., North Liberty, IN (US); David J. Hauck, Granger, IN (US); Gregory E. Kline, South Bend, IN (US); Steven A. Lewis, South Bend, IN (US); George S. Wieger, Niles, MI (US)

(73) Assignee: Honeywell International Inc., Morristown, NJ (US)

(*) Notice: Subject to any disclaimer, the term of this patent is extended or adjusted under 35 U.S.C. 154(b) by 1108 days.

(21) Appl. No.: 10/740,651

(22) Filed: Dec. 18, 2003

(65) Prior Publication Data

US 2005/0022498 A1 Feb. 3, 2005

Related U.S. Application Data

(60) Provisional application No. 60/491,531, filed on Aug. 1, 2003.

(51) Int. Cl.
*F02C 9/00* (2006.01)
*F02G 3/00* (2006.01)

(52) U.S. Cl. .................................. 60/39.281
(58) Field of Classification Search .............. 60/39.281; 251/5, 30.05; 137/625.66, 625.69, 625.11
See application file for complete search history.

(56) References Cited

U.S. PATENT DOCUMENTS

| | | | | |
|---|---|---|---|---|
| 2,605,079 A | * | 7/1952 | Miller et al. | ........... 137/625.64 |
| 2,688,313 A | | 9/1954 | Bauer | |
| 3,378,079 A | * | 4/1968 | Page, Jr. | ..................... 166/129 |
| 3,460,440 A | | 8/1969 | Brent | |
| 3,851,998 A | * | 12/1974 | Downing | .................. 417/199.2 |
| 4,019,527 A | * | 4/1977 | Brand | .................... 137/115.26 |
| 4,041,697 A | * | 8/1977 | Coffinberry et al. | ...... 60/39.281 |
| 4,059,042 A | | 11/1977 | Bridwell et al. | |
| 4,354,345 A | * | 10/1982 | Dreisbach et al. | .......... 60/39.08 |
| 4,623,003 A | * | 11/1986 | Leonard | ................. 137/625.66 |
| 4,817,375 A | * | 4/1989 | Brocard et al. | ........... 60/39.281 |
| 5,784,884 A | | 7/1998 | Poerio et al. | |
| 6,237,617 B1 | | 5/2001 | Sturman et al. | |
| 6,397,590 B1 | | 6/2002 | Hart | |
| 6,981,359 B2 | * | 1/2006 | Wernberg et al. | ........ 60/39.281 |

* cited by examiner

*Primary Examiner*—Michael Cuff
*Assistant Examiner*—Andrew Nguyen
(74) *Attorney, Agent, or Firm*—Ingrassia Fisher & Lorenz, P.C.

(57) ABSTRACT

A thermal recirculation throttle valve (1) for an aircraft fuel system includes a housing (11) having a throttling valve chamber; a cover (5) operatively engaging a first side of the housing (11); a power piston (6) within a power piston sleeve (7), the power piston (6) having a first (21) and second face (22) for control pressure to act upon, the power piston (6) and power piston sleeve (7) operatively engaged with the housing (11) within the throttling valve chamber; a Linear Variable Differential Transformer (15) for measuring a linear position of the power piston (6) within the housing (11); a throttling valve (8) within a throttling valve sleeve (9), the throttling valve (8) operatively engaged with the power piston (60) to transfer the linear movement of the piston (6) between a fully extended and a fully retracted operating position; and a flow deflector (10) engaged with the throttling valve (8) for protecting the housing (11) from flow erosion from fuel exiting flow windows (37). The throttling valve (8) includes a pair of fail-safe operating positions, a fully open operating position, a low leakage shutoff operating position, and a variety of variable flow operating positions between the shutoff and fully open operating positions.

14 Claims, 8 Drawing Sheets

FOUR MODE THERMAL RECIRCULATION THROTTLE VALVE

CROSS REFERENCE TO RELATED APPLICATIONS

This nonprovisional application claims the benefit under 35 U.S.C. § 119 of U.S. Provisional Patent Application No. 60/491,531 filed on Aug. 1, 2003, the entirety of which is hereby incorporated by reference.

This invention was made with Government support under Contract No. N00019-02-C-3003 awarded by the United States Navy. The Government has certain rights in this invention.

TECHNICAL FIELD AND INDUSTRIAL APPLICABILITY OF THE INVENTION

The present invention is generally directed to the field of valves, and more particularly to the field of recirculation valves for aircraft fuel systems.

BACKGROUND OF THE INVENTION

The inventors of the present invention have determined that there are numerous shortcomings with the methods and apparatus of the background art relating to aircraft fuel systems, specifically relating to the method and apparatus relating to the maintenance of optimum fuel system operating temperature for aircraft.

SUMMARY OF THE PRESENT INVENTION

The present invention overcomes several shortcomings associated with the background art and achieves other advantages not realized by the background art. The present invention is intended to alleviate one or more of the following problems and shortcomings of the background art specifically identified hereinabove by the inventors with respect to the background art.

The present invention, in part, is a recognition that it will be advantageous to maintain optimum fuel system operating temperatures on an aircraft by returning a controlled amount of relatively hot fuel to the relatively cool fuel residing in aircraft fuel tank(s).

The present invention, in part, is a recognition that a thermal recirculation valve can be arranged in a Thermal Management System (TMS) to return a controlled amount of relatively hot fuel to aircraft fuel tank(s), allowing the relatively hot fuel to be replaced by relatively cool fuel residing in aircraft fuel tank(s), for the purpose of maintaining optimum fuel system operating temperature(s).

The present invention, in part, is a recognition that a thermal recirculation valve used for maintaining optimum fuel system operating temperature(s) must provide features aimed at improving flight safety.

The present invention, in part, is a recognition that a thermal recirculation valve should provide for fail-safe flows of fuel during period(s) in which the thermal recirculation valve is commanded to, or fails in either a fully open or a fully closed operating position.

The present invention, in part, is a recognition that it will be advantageous to reduce the required number of control valves and related equipment in aircraft fuel systems for the purposes of reducing aircraft weight, reducing system complexity, and improving aircraft safety, reliability and ease of operation.

The present invention, in part, provides a thermal recirculation throttle valve for an aircraft fuel system comprising a housing having a throttling valve chamber; a cover operatively engaging a first side of the housing; a power piston within a power piston sleeve, the power piston having a first and a second face for control pressure to act upon, the power piston and power piston sleeve operatively engaged with the housing within the throttling valve chamber; a Linear Variable Differential Transformer for measuring a linear position of the power piston within the housing; a throttling valve within a throttling valve sleeve, the throttling valve operatively engaged with the power piston to transfer the linear movement of the piston between a fully extended and a fully retracted operating position; and a flow deflector engaged with the throttling valve for protecting the housing from flow erosion from fuel exiting an outlet flow window within the throttling valve sleeve.

The present invention, in part, provides a method of assembling the thermal recirculation throttle valve described hereinabove, the method comprising sub-assembling the throttling valve and the throttling valve sleeve with the flow deflector in a frozen assembly within the housing; and sub-assembling the power piston, power piston sleeve, cover and linear variable differential transformer probe within the throttling valve chamber of the housing.

The present invention, in part, provides a main fuel throttle valve assembly for an aircraft fuel system comprising a main valve housing having a main fuel throttle valve for throttling a supply of fuel to an engine fuel system; a thermal recirculation throttle valve for a thermal management system, the thermal recirculation throttle valve including a cover operatively engaging a first side of a housing; a power piston within a power piston sleeve, the power piston having a first face and a second face for control pressure to act upon, the power piston and power piston sleeve operatively engaged with the housing within the throttling valve chamber; a Linear Variable Differential Transformer for measuring a linear position of the power piston within the housing; a throttling valve within a throttling valve sleeve, the throttling valve operatively engaged with the power piston to transfer the linear movement of the piston between a fully extended and a fully retracted operating position; and a flow deflector engaged with the throttling valve for protecting the housing from flow erosion from fuel exiting the throttling valve.

The present invention, in part, provides a fuel system for an aircraft comprising a fuel storage tank; a fuel booster pump having an inlet connected to the fuel storage tank and an outlet; a main fuel pump having an inlet connected to the outlet of the fuel booster pump and an outlet operatively connected to a main fuel throttle valve and a thermal recirculation throttle valve, the main fuel pump providing a supply of fuel to an engine fuel system and a thermal management system via the main fuel throttle valve and the thermal recirculation throttle valve, respectively; the main valve housing having a main fuel throttle valve for throttling a supply of fuel to the engine fuel system from the main fuel pump; the thermal recirculation throttle valve for the thermal management system, the thermal recirculation throttle valve including a cover operatively engaging a first side of a housing; a power piston within a power piston sleeve, the power piston having a first and a second face for control pressure to act upon, the power piston and power piston sleeve operatively engaged with the housing; a Linear Variable Differential Transformer for measuring a linear position of the power piston within the housing; a throttling valve within a throttling valve sleeve, the throttling valve operatively engaged with the power piston to transfer the linear movement of the piston between a fully extended and a fully retracted operating position; and a flow deflector engaged with the throttling valve for protecting the housing from flow erosion from fuel exiting the throttling valve.

BRIEF DESCRIPTION OF THE DRAWINGS

The present invention will become more fully understood from the detailed description given hereinafter and the accompanying drawings that are given by way of illustration only, and thus do not limit the present invention.

DETAILED DESCRIPTION OF THE PREFERRED EMBODIMENTS

The present invention will now be described in detail with reference to the accompanying drawings. As discussed hereinabove, the present inventors have determined that an effective, integrated Thermal Management System (TMS) for an aircraft using relatively cool fuel from an aircraft fuel tank to maintain optimum fuel system operating temperatures should incorporate several safety features. A thermal recirculation throttle valve (TRTV) 1 according to the present invention provided in a fuel system controlled by this type of Thermal Management System addresses several safety and operational features.

Figure 8:
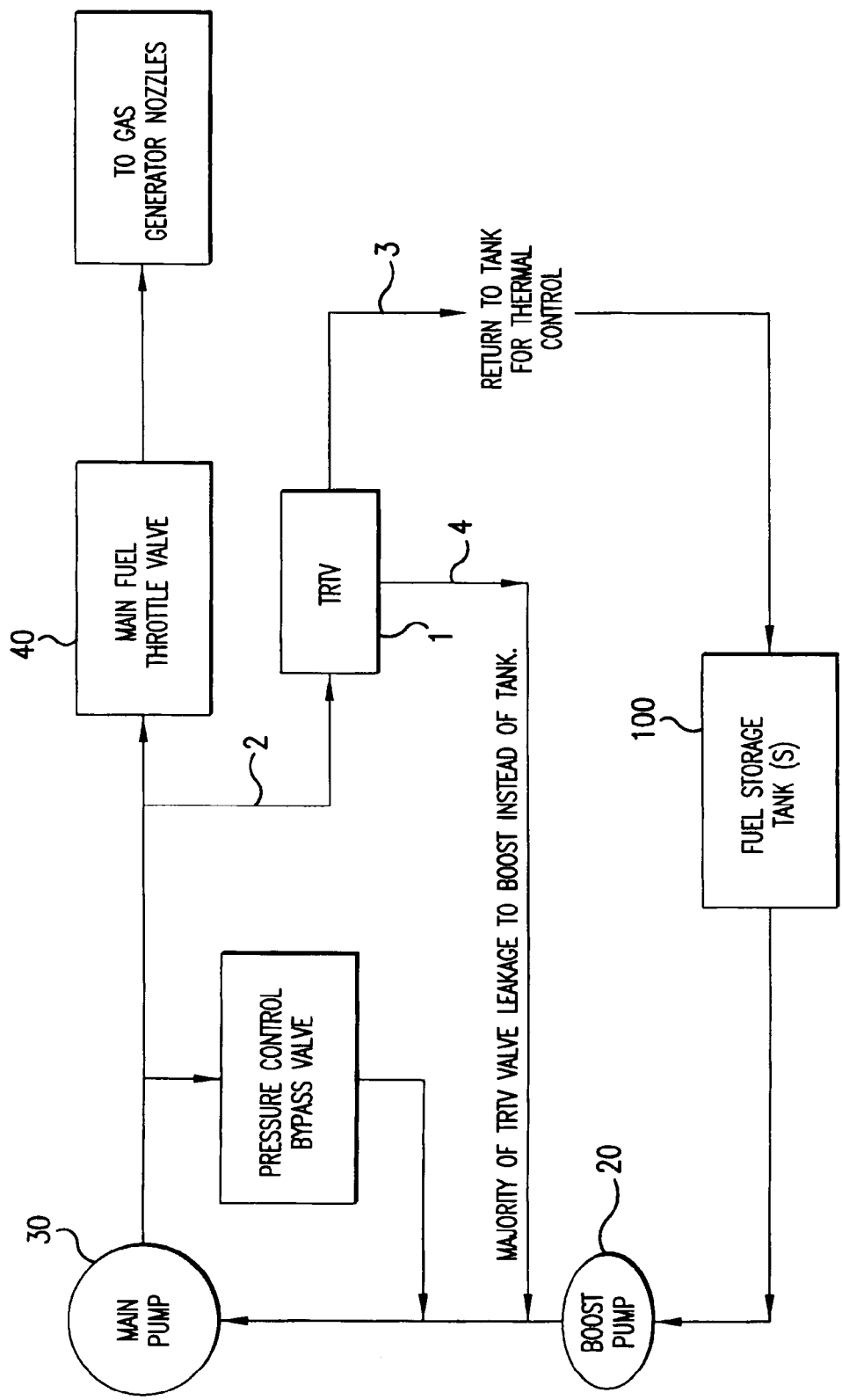
FIG. 8 is a schematic view of an exemplary fuel system incorporating a thermal recirculation throttle valve in conjunction with a main fuel throttle valve.

FIG. 8 is a partial schematic of an exemplary fuel system incorporating a thermal recirculation throttle valve (TRTV) 1 in conjunction with a main fuel throttle valve (MFTV) 40. A fuel storage tank 100, a fuel booster pump 20, a main fuel pump 30, a main fuel throttle valve 40 for metering a supply of fuel to the main engine fuel system and a thermal recirculation throttle valve (TRTV) 1 for returning relatively hot fuel to an aircraft's fuel storage tank(s) 100 is incorporated into the partial schematic shown in FIG. 8. Although only one of each of the aforementioned components has been shown in the exemplary schematic, the number of the individual components may be increased or decreased based on system requirements. Further, valves and system controls have been omitted to simplify the system schematic.

The unique thermal recirculation throttle valve 1 of the present invention is designed to limit a relatively low leakage flow to the fuel storage tank(s) 100 when the TRTV 1 is in a low leakage shutoff position. In the present invention, the low leakage shutoff position can be accomplished by venting the low leakage shutoff position to a relatively low system pressure, e.g., fuel booster pump outlet pressure as discussed hereinabove. In addition, the TRTV 1 should include a fully open position, e.g., maximum flow of fuel through the TRTV 1 to maintain fuel system operating temperature(s) to an optimum value during normal operation. Further, if the TRTV 1 is commanded to, or fails to either a fail-safe fully extended or a fail-safe fully retracted position, the TRTV 1 will also provide a fail-safe flow of fuel to return a predetermined supply of fuel to the fuel tank, e.g. aircraft fuel tank(s).

Figure 1:
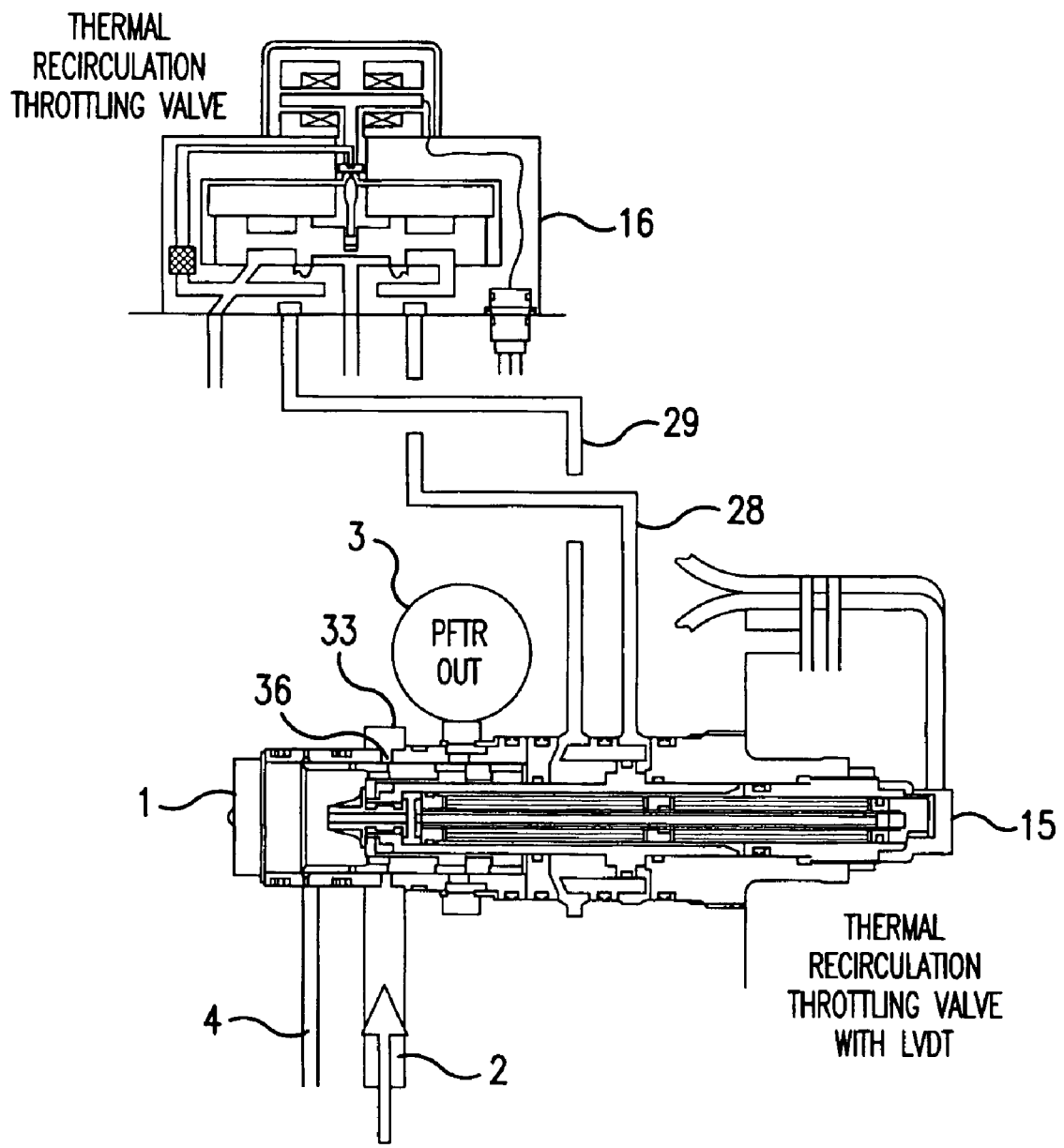
FIG. 1 is schematic view of thermal recirculation throttle valve according to an embodiment of the present invention.

FIG. 1 is schematic view of thermal recirculation throttle valve according to an embodiment of the present invention. As seen in FIG. 1, the thermal recirculation throttle valve permits a variety of fuel flows over a wide range of system pressures, e.g., system pressures can range from approximately 50 psi (or even lower at the fuel storage tank) to 1500 psi or more at the main fuel pump 30 outlet. In a normal operating mode, the thermal management recirculation fuel flow supplied from the main fuel pump 30 to the aircraft's thermal management system is supplied through a pair of inlet and outlet ports. The failsafe mode simply provides flow for fault accommodation during failures occurring at either end of the valve's travel. The shutoff mode blocks the return of fuel to the fuel tank(s) when cooling is not required. However in shutoff mode, the present invention incorporates a low leakage flow of fuel in a return vented to a low system pressure, e.g., such as the outlet of the fuel booster pump (and some very low leakage back to the fuel tank 100).

In FIG. 1, the TRTV 1 is also shown having a LVDT (Linear Variable Differential Transformer) 15 that measures linear position of the valve, and the TRTV 1 being hydraulically coupled to an EHSV (Electro Hydraulic Servo Valve) 16 by way of fluid channels 28 and 29. The LVDT 15 and EHSV 16 are both electronically connected to a FADEC (Full Authority Digital Electronic Control, not shown), which creates a closed loop for controlling the TRTV 1 position. The FADEC sends an electrical signal to the EHSV 16, which in turn, sends hydraulic signals (control pressures) to the TRTV 1, resulting in valve movement. The LVDT 15 measures the linear position of the valve, and sends an electrical signal back to the FADEC, creating the closed loop control of the TRTV 1. It should be apparent that the FADEC fully controls the linear position of the TRTV 1, based on measuring and meeting desired engine operational parameters.

Figure 2:
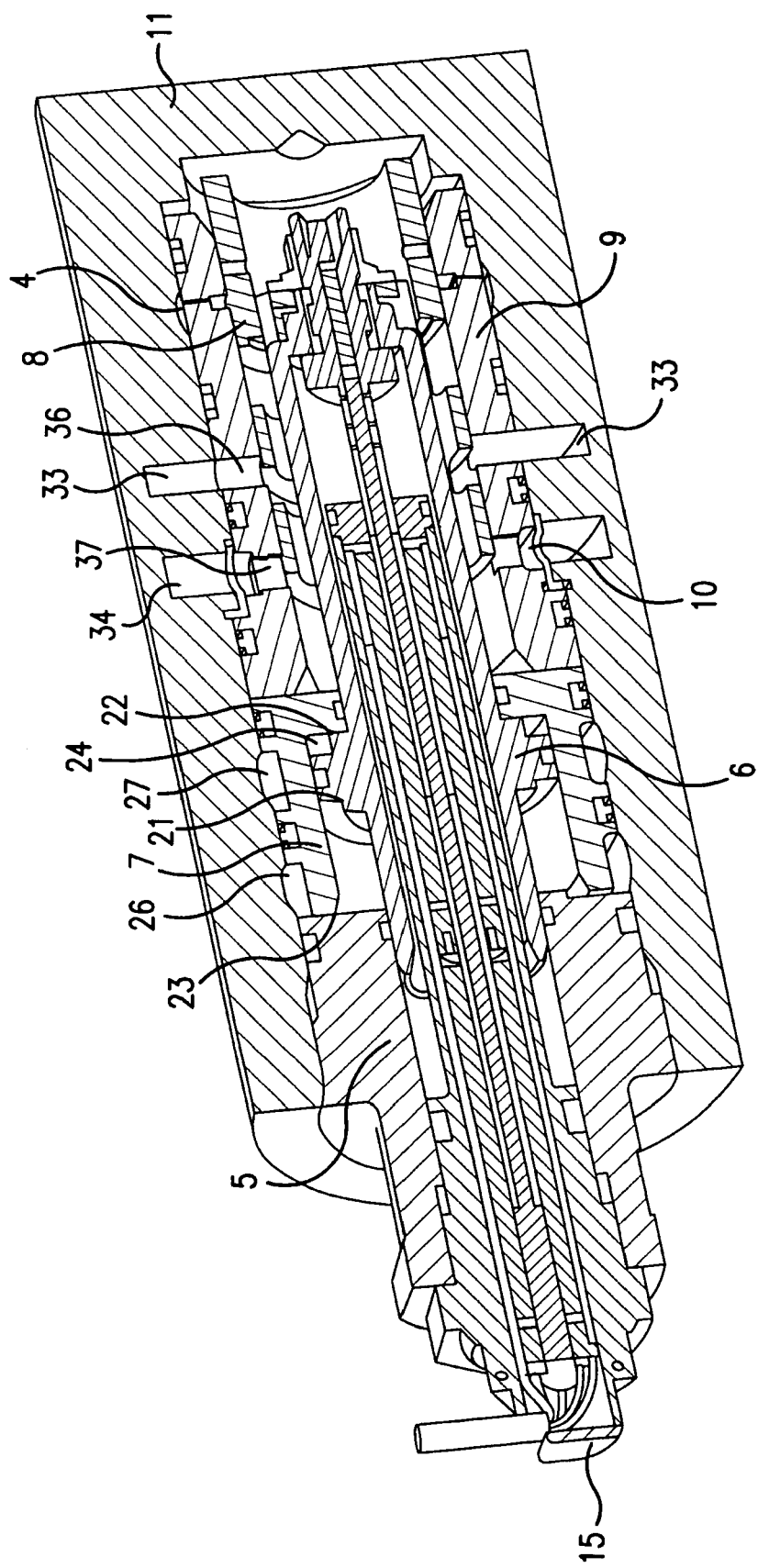
FIG. 2 is a partial perspective view as shown along an axial centerline of the thermal recirculation throttle valve of the present invention.

FIG. 2 is a partial perspective view as shown along an axial centerline of the thermal recirculation throttle valve of the present invention. As seen in FIGS. 1 and 2, a thermal recirculation throttle valve 1 is operatively connected to an EHSV 16, and a supply of fuel from the fuel pumps 20, 30, e.g., a main fuel pump 30 in an aircraft's thermal management system (TMS). The thermal recirculation throttle valve 1 is provided for throttling the thermal management recirculation fuel flow supplied from the fuel pumps 20, 30 to the aircraft's fuel storage tank(s) 100.

The TRTV 1 includes an LVDT 15 as mentioned hereinabove that measures linear position of the valve. The LVDT 15 may include a magnetic core inside a coil winding assembly. The magnetic core provides a magnetic flux linking primary and secondary coils of the LVDT 15. An excitation signal is applied to the primary coil and induces voltages within the two secondary coils. The center or zero position of the LVDT is extremely reliable and stable for providing precise linear position measurement of the TRTV 1. This measurement is electronically communicated to the FADEC, which in turn commands the EHSV 16 to accurately position the TRTV 1 by way of hydraulic channels 28 and 29.

The TRTV 1 also includes a cover 5 enclosing a first side of the TRTV 1 within a housing 11. The housing 11 may be a separate housing for the TRTV or the TRTV 1 may be provided in a portion of the housing of the main fuel throttle valve 40. A power piston 6 is operatively engaged with a throttling valve 8 that are capable of a linear movement between a variety of operating positions throughout the stroke of the valve 8 and power piston 6. The throttling valve 8 and the power piston 6 are engaged with a throttling valve sleeve 9 and a power piston sleeve 7, respectively. The power piston 6 includes a first face 21 and a second face 22. Pressurized fuel (control pressures) flowing to or from EHSV 16 creates a force acting on the surface area of these faces which influences power piston 6 and throttling valve 8 to linearly translate to the variety of operating positions. The control pressures communicate to the faces by way of channels 28 and 29, that are connected to annuli 26 and 27 in housing 11, then pass through side wall aperture 23 in cover 5, and side wall aperture 24 in power piston sleeve 7, into chambers that are bounded in part by the faces. It should be noted that the TRTV 1 has no other areas that influence the position of the power piston 6 and throttling valve 8.

One of skill in the art will appreciate that a variety of O-rings and seals are provided and shown in the enclosed figures at various interfaces, e.g., between the housing 11 and TRTV 1 components and between the individual TRTV 1 components to provide a variety of sealed fuel paths and operating positions. As seen in FIG. 2, a flow deflector 10 is also provided to protect the housing 11 from flow erosion that can result from high pressure/high velocity fuel exiting the TRTV 1 at certain operating positions.

Although the TRTV 1 and its components may be constructed for a wide range of materials, a TRTV 1 of a preferred embodiment includes valve components constructed of Grade 440C stainless steel, e.g., having a high carbon content that makes this material well suited for the wide ranges of pressure, linear movement and application of the TRTV 1. Although Grade 440 C is generally capable of attaining the highest strength, e.g., HRC 55-62, hardness and wear resistance of all the stainless alloys, alternative materials may be substituted depending on desired variations in material properties such as strength, hardness and wear resistance.

Figure 3:
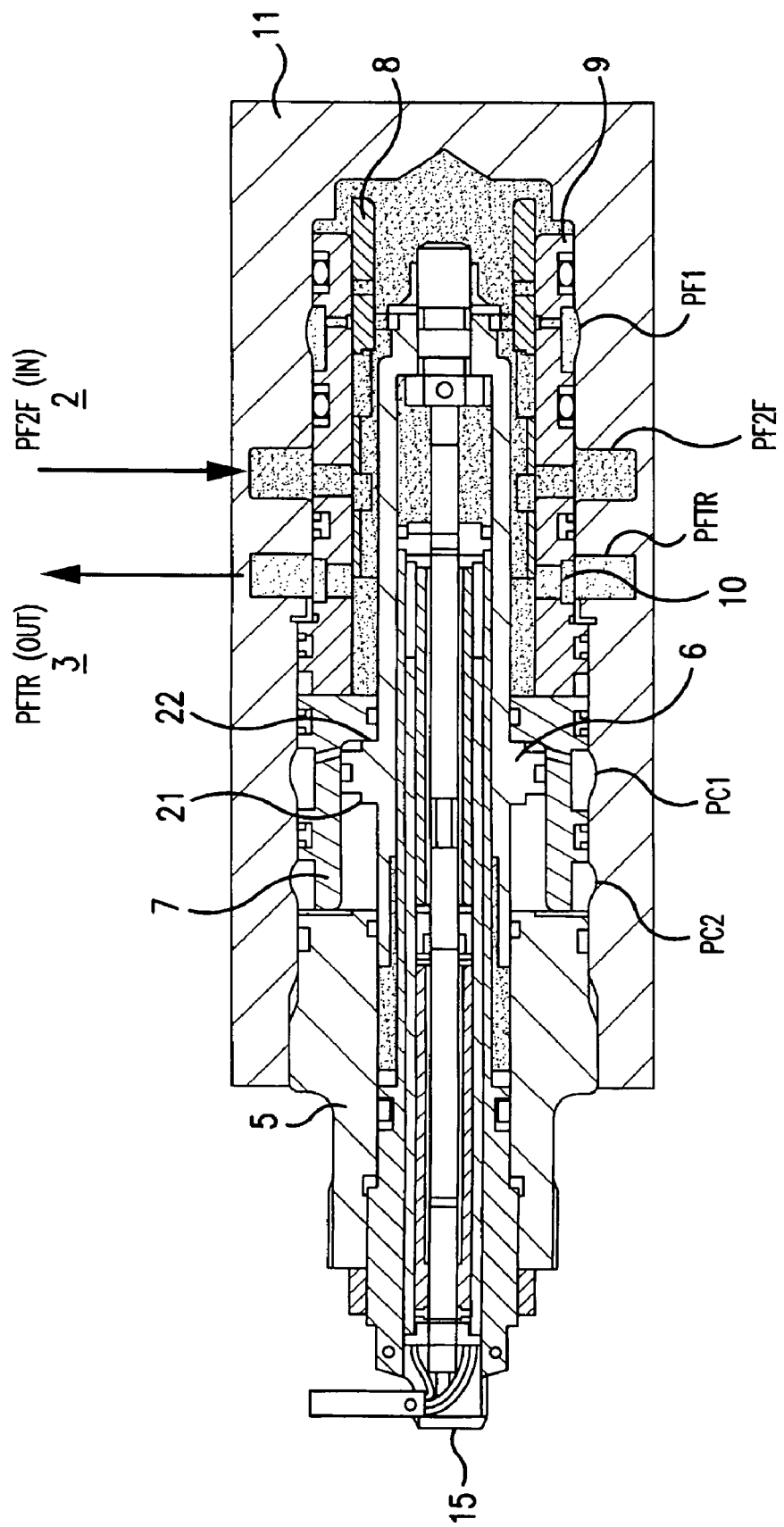
FIG. 3 is a partial sectional view taken along the axial centerline of the thermal recirculation throttle valve shown in FIG. 2 when the valve is in a fail-safe extended position.
Figure 4:
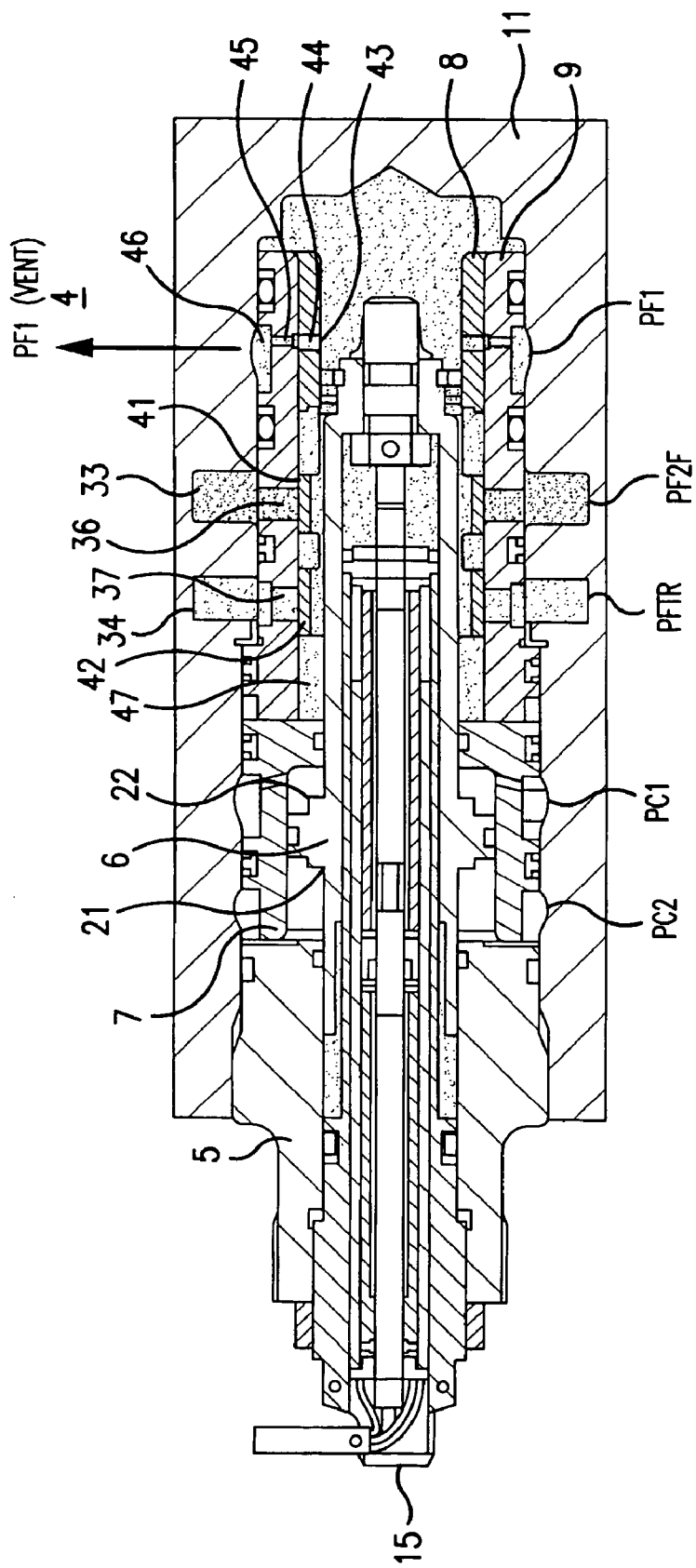
FIG. 4 is a partial sectional view taken along the axial centerline of the thermal recirculation throttle valve shown in FIG. 2 when the valve is in a low leakage shut-off operating position.

The thermal recirculation throttling valve (TRTV) 1 is specifically designed to have main pump 30 discharge fuel PF2F be throttled as it enters the TRTV 1, and have the throttled fuel PFTR exit the TRTV 1, returning the fuel to the fuel storage tank 100, to control fuel temperature entering the MFTV 40 (see FIGS. 1, 3, 4, 6 and 8). In detail, PF2F fuel is routed from main pump 30, by way of conduit 2, to annulus 33 in housing 11, through a set of inlet flow windows 36 in throttling valve sleeve 9, to a set of axial flow channels 47 in throttling valve 8, and exits the TRTV 1 through a set of exit throttling windows 37 in throttling valve sleeve 9, passing by deflector 10, to annulus 34 in housing 11, returning the fuel PFTR to the fuel storage tank 100 by way of conduit 3. In the low leakage fuel shutoff position as shown in FIG. 4, the inlet throttling windows 36 and exit flow windows 37 are closed by lands 41 and 42 on throttling valve 8, and the inside of throttling valve 8 is vented to the low pressure PF1 pump inlet side of main pump 30. It is only in the fuel shutoff position that PF1 venting occurs. In detail, fuel inside of throttling valve 8 vents through side wall apertures 43 in throttling valve 8, to annulus 44 and side wall apertures 45 in throttling valve sleeve 9, to annulus 46 in housing 11, to PF1 by way of conduit 4.

It should be noted that leakage to the fuel tank is minimized by having high pressure PF2F routed from out to in on the valve, minimizing the high pressure leak path area bounded by inlet throttling windows 36 and land 41, and by venting the inside of the valve with low pressure PF1, minimizing the pressure drop to PFTR (return to fuel tank pressure) in the leak path area bounded by exit flow windows 37 and land 42. To further restrict leakage, the OD of valve 8 is match ground to the ID of throttling valve sleeve 9 to minimize the diametrical clearance, e.g., 0.0003-0.0005 OD to ID diametrical clearance. If the TRTV fails toward either end of travel, the flow windows are opened to the fail-safe mode, and the vent to PF1 is closed. In the fail-safe mode, the flow windows are only partially opened depending on the setting for the desired flow of the TMS.

FIG. 3 is a partial sectional view taken along the axial centerline of the thermal recirculation throttle valve shown in FIG. 2 when the valve is in a fail-safe extended position. In FIG. 3, a fail-safe extended position is shown, e.g., the piston 6 is fully extended to a zero stroke position and the inlet throttling windows 36 are only partially opened to permit a desired fail safe flow. This position would be typical if the thermal recirculation electro-hydraulic servo valve (EHSV) 16 experienced a hard-over failure. Since the outlet throttling windows 37 are only partially open, a desired fail safe flow of fuel to PFTR (such as JP-5 or other aircraft fuel) is provided for thermal management, e.g., such approximately 6000 lbs/hour of flow at a 0.000 inch stroke.

FIG. 4 is a partial sectional view taken along the axial centerline of the thermal recirculation throttle valve shown in FIG. 2 when the valve is in a shut-off operating position. In the shut-off position, the supply of fuel is cut-off to PFTR. However, as discussed in detail hereinabove, the valve is vented to PF1 back to the outlet side of the fuel booster pump 20. In this operating position, e.g., occurring at approximately 0.195 inch of stroke, only low leakage flow back to the low pressure side of the fuel system (PF1), and low leakage flow to the fuel storage tank 100 (PFTR) exist.

Figure 5:
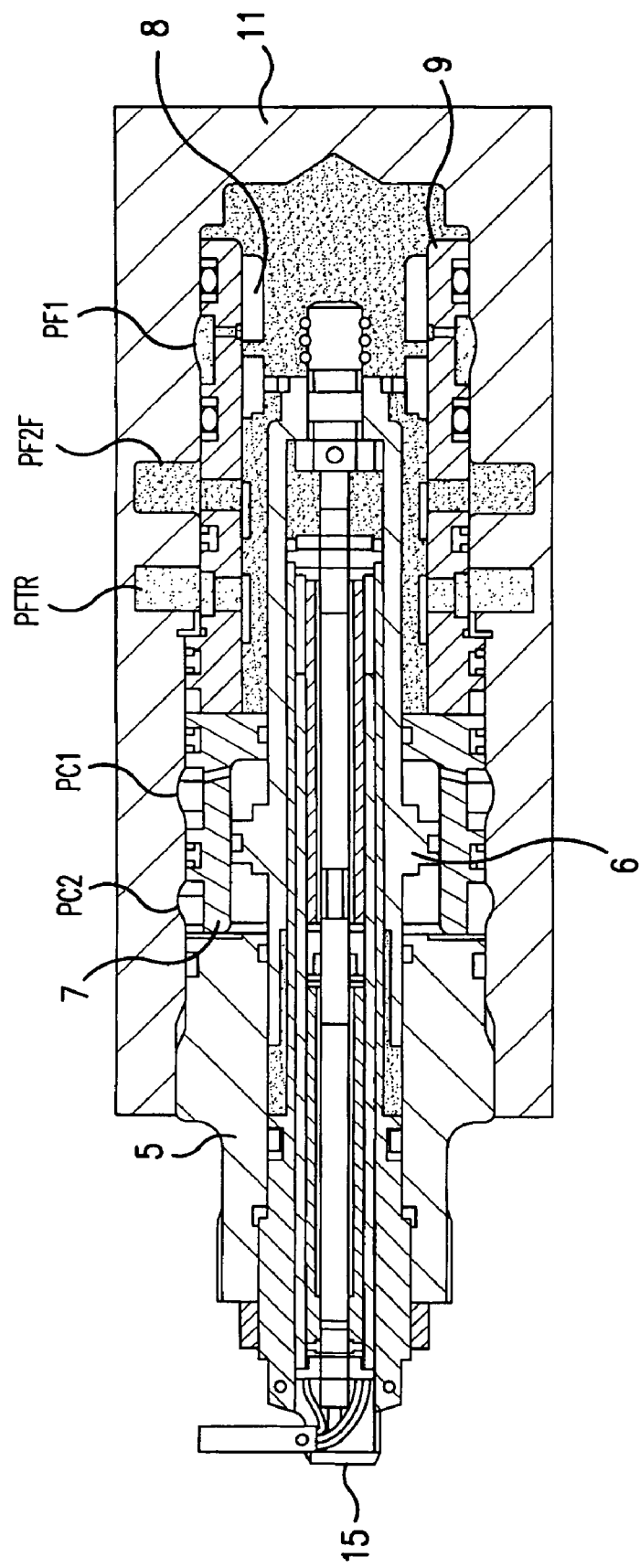
FIG. 5 is a partial sectional view taken along the axial centerline of the thermal recirculation throttle valve shown in FIG. 2 when the valve is in a cracking position.

FIG. 5 is a partial sectional view taken along the axial centerline of the thermal recirculation throttle valve shown in FIG. 2 when the valve is in a cracking position. In the cracking position, the inlet throttling windows 36 are only slightly opened to permit the start of fuel to flow to PFTR. This position occurs at a position of 0.300 inches of stroke in a preferred embodiment.

Figure 6:
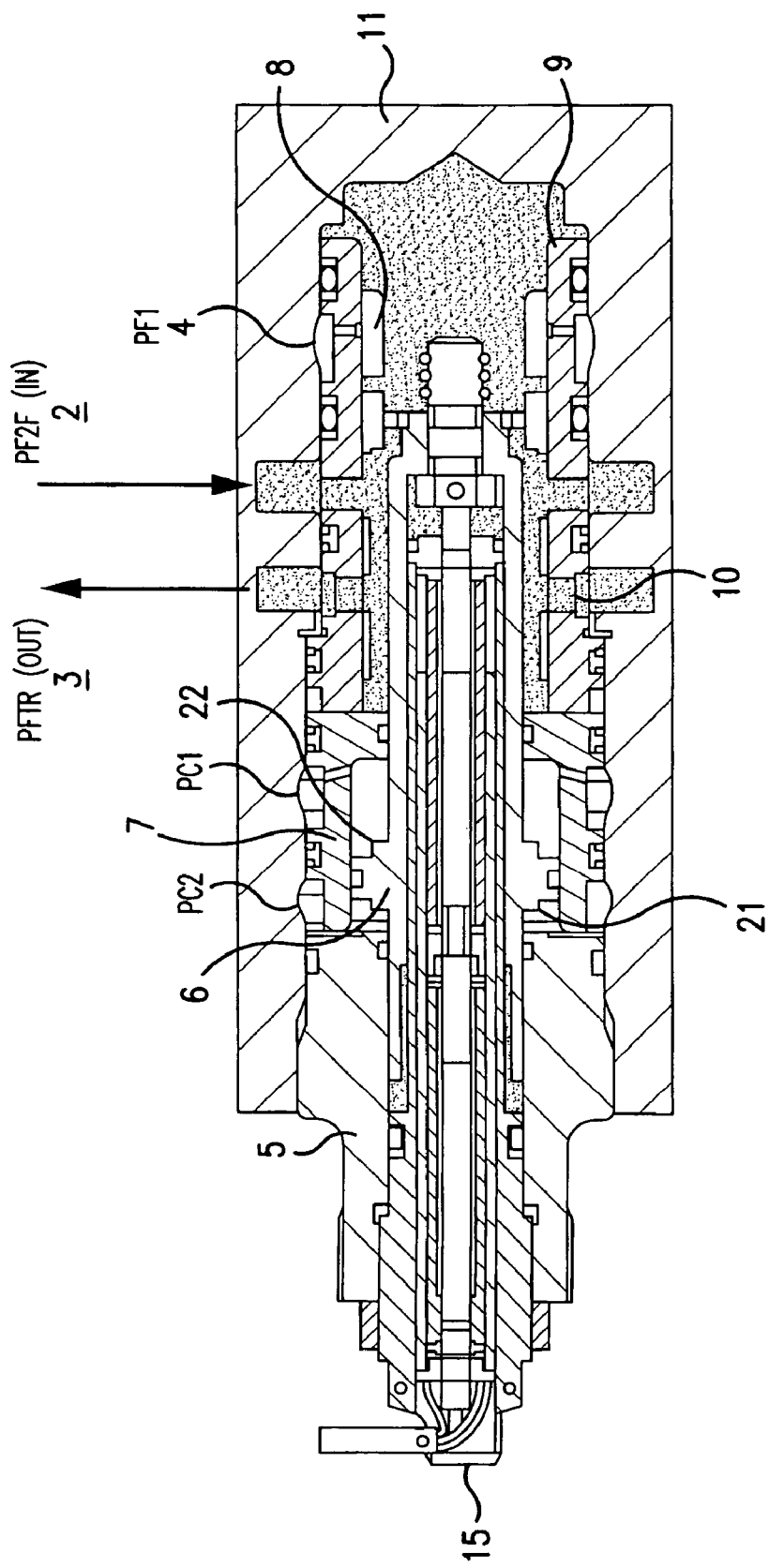
FIG. 6. is a partial sectional view taken along the axial centerline of the thermal recirculation throttle valve shown in FIG. 2 when the valve is in a fully open operating position.

FIG. 6. is a partial sectional view taken along the axial centerline of the thermal recirculation throttle valve shown in FIG. 2 when the valve is in a fully open operating position. In the fully open operating position, the TRTV 1 permits the maximum flow of fuel of the TMS since the inlet PF2F flow windows 36, and outlet PFTR flow windows 37 are fully open. This position will occur during normal operating positions where the TMS is requiring a maximum flow of cooling fuel, e.g., approximately 10, 500 lbs/hour of fuel at a 0.500 inch stroke.

Figure 7:
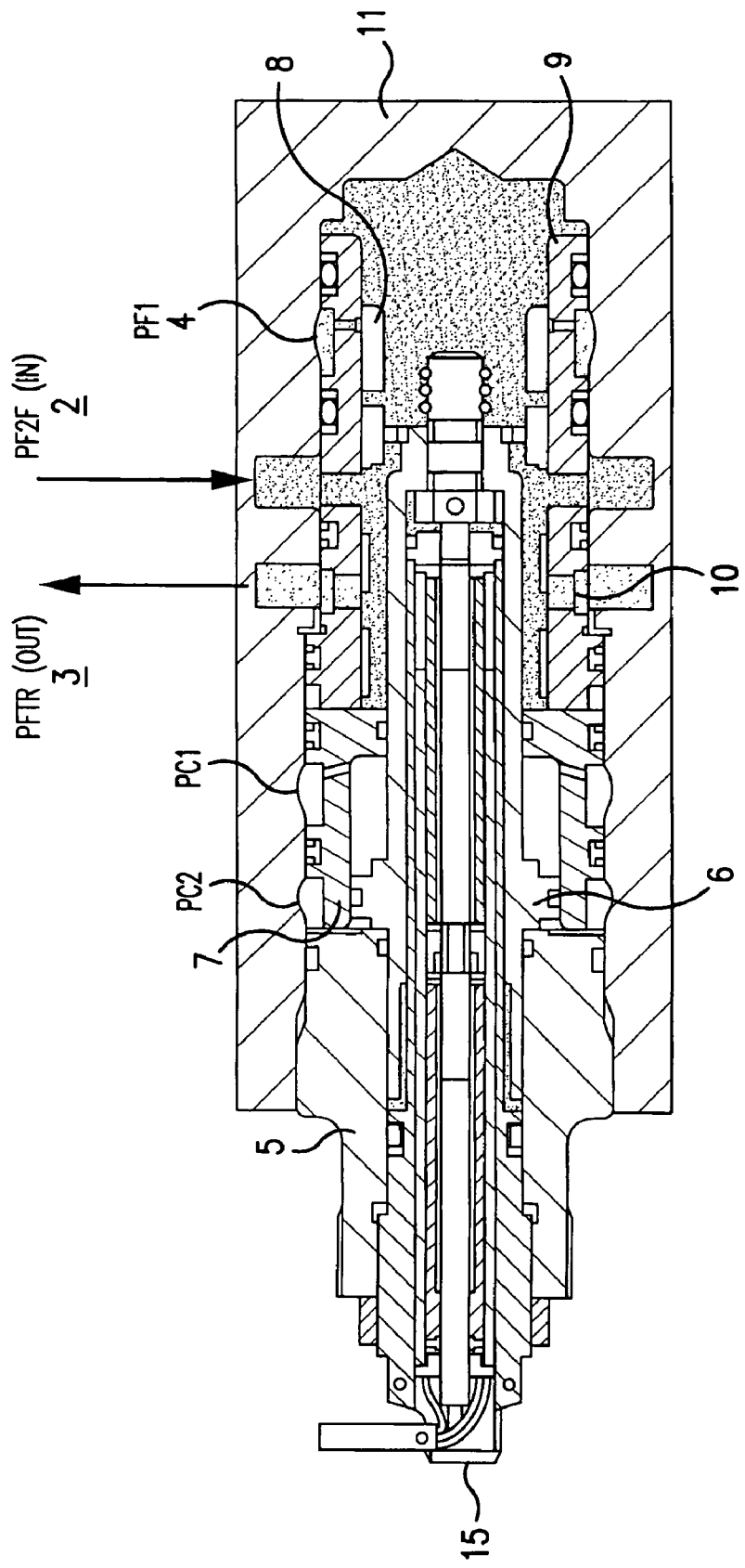
FIG. 7. is a partial sectional view taken along the axial centerline of the thermal recirculation throttle valve shown in FIG. 2 when the valve is in a fail-safe retracted operating position.

FIG. 7. is a partial sectional view taken along the axial centerline of the thermal recirculation throttle valve shown in FIG. 2 when the valve is in a fail-safe retracted operating position. In a fail-safe retracted position, the inlet throttling windows 36 are only partially opened to permit a desired fail safe flow of fuel to PFTR, e.g., 6000 lbs/hour at a 0.625 inch stroke, to the TMS. This fail-safe operating position may occur during a TR EHSV 16 hard-over failure as discussed above with reference to FIG. 3, or may be intentionally commanded to this position by other conditions and components in MFTV 40 not shown.

In order to expedite the assembly of the various components of the TRTV 1 into a housing 11, the relatively tight clearances of the sleeves 7, 9 and flow deflector 10 may require a frozen assembly process with the main body housing 11. The flow deflector 10 may be assembled to the throttling valve sleeve 9 with petroleum jelly that will secure the flow deflector position once it is frozen. The valve sleeve 9 with its outer diameter seals and O-rings are compressed and frozen to prevent damage to the seals and O-rings during installation. These components may be frozen with refrigerant, dry ice or liquid nitrogen baths to expedite this portion of the sub-assembly. The valve 9, power piston 6, power piston sleeve 7 and LVDT probe 15 are then sub-assembled prior to installation into the housing 11. The TRTV 1 is installed for providing a flow of fuel to the TMS as scheduled by an on-board Full Authority Digital Electronic Control (FADEC) system.

What is claimed is:

1. A thermal recirculation throttle valve for an aircraft fuel system, the thermal recirculation throttle valve comprising: a housing having a throttling valve chamber, an inlet, a first outlet, and a second outlet; a power piston disposed within the housing for translational movement therein; and a throttling valve mounted to the power piston and configured to move therewith between: (i) a fuel shut-off position wherein the throttling valve substantially blocks fuel flow from the inlet to the first outlet and substantially permits fuel flow from the throttling valve chamber to the second outlet, (ii) a fully open operating position wherein the throttling valve substantially permits fuel flow from the inlet to the first outlet and substantially blocks fuel flow from the throttling valve chamber to the second outlet, (iii) a failsafe extended position wherein the throttling valve permits a predetermined flow from the inlet to the first outlet, and (iv) a failsafe retracted position wherein the throttling valve permits a predetermined flow from the inlet to the first outlet;

wherein the fuel shut-off position resides between the failsafe extended position and the fully open operating position, and wherein the fully open operating position resides between the failsafe retracted position and fuel shut-off position;

and wherein the thermal recirculation throttle valve further comprises means for preventing the throttling valve from extending beyond the failsafe extended position, and means for preventing the throttling valve from retracting beyond the failsafe retracted position.

2. The thermal recirculation throttle valve according to claim 1, wherein the fully open operating position of the throttling valve permits a maximum flow of fuel through the first outlet.

3. The thermal recirculation throttle valve according to claim 2, wherein the maximum flow of fuel is approximately 10,500 lbs/hour of aircraft fuel.

4. The thermal recirculation throttle valve according to claim 1, further comprising an inlet flow window control land and an outlet flow window control land being formed on the throttling valve, the control lands operatively controlling a flow of fuel from the inlet to the first outlet and to the second outlet.

5. A main fuel throttle valve assembly for an aircraft fuel system including a fuel storage tank and a main pump, the main fuel throttle valve assembly comprising:

a main fuel throttle valve configured to receive fuel from the main pump and drawn from the fuel storage tank;

a thermal recirculation throttle valve, comprising:

a housing having a throttling valve chamber, an inlet configured to be fluidly coupled to an outlet of the main pump, a first outlet configured to be fluidly coupled to the inlet of the main pump, and a second outlet configured to be fluidly coupled to an inlet of the fuel storage tank;

a power piston disposed within the housing for translational movement therein;

a throttling valve mounted to the piston and configured to move therewith between: (i) a fuel shut-off position wherein the throttling valve substantially blocks fuel flow from the inlet to the first outlet and substantially permits fuel flow from the throttling valve chamber to the second outlet, (ii) a fully open operating position wherein the throttling valve substantially permits fuel flow from the inlet to the first outlet and substantially blocks fuel flow from the throttling valve chamber to the second outlet, (iii) a failsafe extended position wherein the throttling valve permits a predetermined flow from the inlet to the first outlet, and (iv) a failsafe retracted position wherein the throttling valve permits a predetermined restricted flow from the inlet to the first outlet;

a first structural element within the housing and configured to engage at least one of the power piston and the throttling valve to prevent the throttling valve from extending beyond the failsafe extended position; and a second structural element within the housing and configured to engage at least one of the power piston and the throttling valve to prevent the throttling valve from retracting beyond the failsafe retracted position;

wherein the fuel shut-off position resides between the fully open operating position and the failsafe extended position, and wherein the fully open operating position resides between the fuel shut-off position and the failsafe retracted position.

6. The main fuel throttle valve assembly according to claim 5, wherein the fully open operating position of the throttling valve permits a maximum flow of fuel through the inlet.

7. The main fuel throttle valve assembly according to claim 6, wherein the maximum flow of fuel is approximately 10,500 lbs/hour of aircraft fuel.

8. The main fuel throttle valve assembly according to claim 5, further comprising an inlet flow window control land and an outlet flow window control land being formed on the throttling valve, the control lands operatively controlling a flow of fuel from the inlet to the first outlet and to the second outlet.

9. A fuel system for an aircraft including a plurality of gas generator nozzles, the fuel system comprising: a fuel storage tank;

a main fuel throttle valve configured to be fluidly coupled to the plurality of gas generator nozzles and to supply metered fuel thereto;

a main fuel pump fluidly coupled between the main fuel throttle valve and the fuel storage tank, the main fuel pump configured to supply the main fuel throttle valve with pressurized fuel from the fuel storage tank; and a thermal recirculation throttle valve, comprising:

a housing having a throttling valve chamber, an inlet fluidly coupled to an outlet of the main pump, a first outlet fluidly coupled to the inlet of the main pump, and a second outlet fluidly coupled to an inlet of the fuel storage tank;

a power piston disposed within said housing for translational movement therein; and a throttling valve mounted to the piston and configured to move therewith between: (i) a fuel shut-off position wherein the throttling valve substantially blocks fuel flow from the inlet to the first outlet and substantially permits fuel flow from the throttling valve chamber to the second outlet, (ii) a fully open operating position wherein the throttling valve substantially permits fuel flow from the inlet to the first outlet and substantially blocks fuel flow from the throttling valve chamber to the second outlet, (iii) a failsafe extended position wherein the throttling valve permits a predetermined flow from the inlet to the first outlet, and (iv) a failsafe retracted position wherein the throttling valve permits a predetermined flow from the inlet to the first outlet; wherein the fuel shut-off position and the fully open operating position reside intermediate the failsafe extended position and the failsafe retracted position; and wherein the thermal recirculation throttle valve further comprises means for preventing the throttling valve from extending beyond the failsafe extended position, and means for preventing the throttling valve from retracting beyond the failsafe retracted position.

10. The fuel system according to claim 9, wherein the thermal recirculation throttle valve includes a low pressure vent to a low pressure side of the fuel system.

11. The fuel system according to claim 10 further comprising a booster pump fluidly coupled between the fuel storage tank and the main fuel pump, the low pressure side of the fuel system comprising an outlet of the booster pump.

12. The fuel system according to claim 9 wherein the aircraft further includes an electronic control and wherein the fuel system further comprises:

a servo valve hydraulically coupled to the thermal recirculation throttle valve and operatively coupled to the electronic control, the servo valve cooperating with the electronic control to selectively move the power piston between the fuel shut-off position and the fully open position to apportion fuel between the fuel storage tank and the main pump and thereby regulate the temperature of the fuel conducted by the fuel system.

13. The fuel system according to claim 12, further comprising:

a housing cover fixedly coupled to the housing;

a throttling valve sleeve fixedly mounted within the housing and including first and second windows therethrough aligning with the inlet and the first outlet, respectively; and a power piston sleeve fixedly mounted within the housing between the housing cover and the throttling valve sleeve.

14. The fuel system according to claim 13, wherein the power piston includes first and second opposing radial faces that cooperate with the power piston sleeve and the housing cover to define first and second chambers within the throttling valve sleeve, the servo valve fluidly coupled to the first and second chambers and configured to adjust the pressure therein to control the translational position of the piston.

* * * * *

UNITED STATES PATENT AND TRADEMARK OFFICE
CERTIFICATE OF CORRECTION

| | |
|---|---|
| PATENT NO. | : 7,607,285 B2 |
| APPLICATION NO. | : 10/740651 |
| DATED | : October 27, 2009 |
| INVENTOR(S) | : Futa, Jr. et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1458 days.

Signed and Sealed this

Twelfth Day of October, 2010

David J. Kappos
*Director of the United States Patent and Trademark Office*